(12) United States Patent
Kondo et al.

(10) Patent No.: US 8,169,656 B2
(45) Date of Patent: May 1, 2012

(54) IMAGE PROCESSING DEVICES AND METHODS FOR RESIZING AN ORIGINAL IMAGE THEREFOR

(75) Inventors: Masaki Kondo, Toyoake (JP);
Tomohiko Hasegawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1261 days.

(21) Appl. No.: 11/656,013

(22) Filed: Jan. 22, 2007

(65) Prior Publication Data

US 2007/0206206 A1 Sep. 6, 2007

(30) Foreign Application Priority Data

Jan. 30, 2006 (JP) ................. P2006-020083

(51) Int. Cl.
*G06K 15/02* (2006.01)
*G06F 3/12* (2006.01)
(52) U.S. Cl. .......... 358/1.2; 358/1.9; 358/1.13; 345/660
(58) Field of Classification Search .................. None
See application file for complete search history.

(56) References Cited

U.S. PATENT DOCUMENTS

| 5,734,756 | A | * | 3/1998 | Sherman et al. | 382/259 |
|---|---|---|---|---|---|
| 6,069,974 | A | * | 5/2000 | Tsukada et al. | 382/170 |
| 6,341,178 | B1 | * | 1/2002 | Parker | 382/243 |
| 6,751,001 | B1 | * | 6/2004 | Tanner et al. | 359/238 |
| 2002/0176622 | A1 | | 11/2002 | Watanabe et al. | |
| 2003/0189579 | A1 | * | 10/2003 | Pope | 345/660 |
| 2004/0051789 | A1 | | 3/2004 | Horita | |
| 2004/0051794 | A1 | | 3/2004 | Horita | |
| 2005/0083364 | A1 | * | 4/2005 | Billow | 347/19 |
| 2005/0195424 | A1 | | 9/2005 | Kojima et al. | |
| 2005/0219555 | A1 | * | 10/2005 | Onuma et al. | 358/1.1 |
| 2006/0055953 | A1 | * | 3/2006 | Ishii et al. | 358/1.13 |
| 2006/0193533 | A1 | * | 8/2006 | Araki et al. | 382/275 |

FOREIGN PATENT DOCUMENTS

| JP | H05-221024 A | 8/1993 |
|---|---|---|
| JP | 2002-290763 A | 10/2002 |
| JP | 2003256827 | 9/2003 |
| JP | 2004102904 | 4/2004 |

OTHER PUBLICATIONS

Japan Patent Office, Office Action for Japanese Patent Application No. 2006-020083, mailed Oct. 5, 2010.

\* cited by examiner

*Primary Examiner* — Vincent Rudolph
(74) *Attorney, Agent, or Firm* — Baker Botts L.L.P.

(57) ABSTRACT

The present invention provides an image processing device for processing an original image having a first number of horizontal lines parallel to one another. Each of the first number of horizontal lines includes a second number of pixels. The image processing device has a processing unit and a storage unit. The processing unit resizes the original image to an output image with a scaling factor, the output image having a plurality of target pixels. The storage unit stores a gray scale of each pixel in at least one of the first number of horizontal lines. The processing unit has a first calculating unit, a selecting unit, and a second calculating unit. The first calculating unit calculates a maximum number of horizontal lines which the storage unit is able to store at once, based on the second number of pixels, the maximum number being less than the first number. The selecting unit selects a resizing method to resize the original image based on the scaling factor and the maximum number of horizontal lines. The second calculating unit calculates a gray scale of the target pixel in the output image with the selected method.

15 Claims, 4 Drawing Sheets

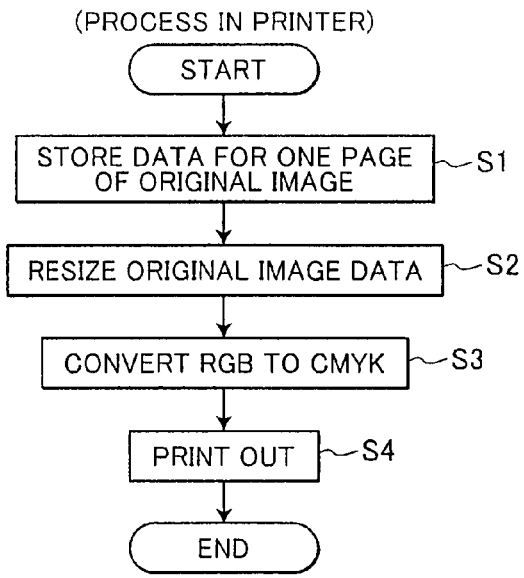
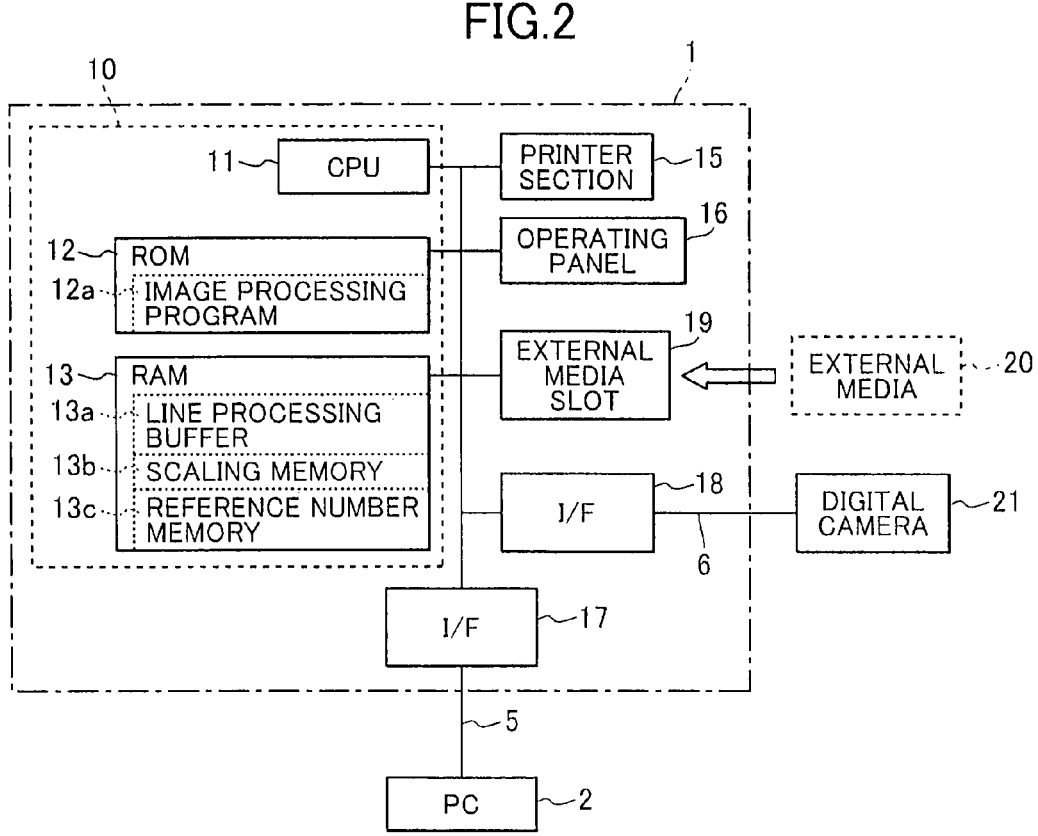

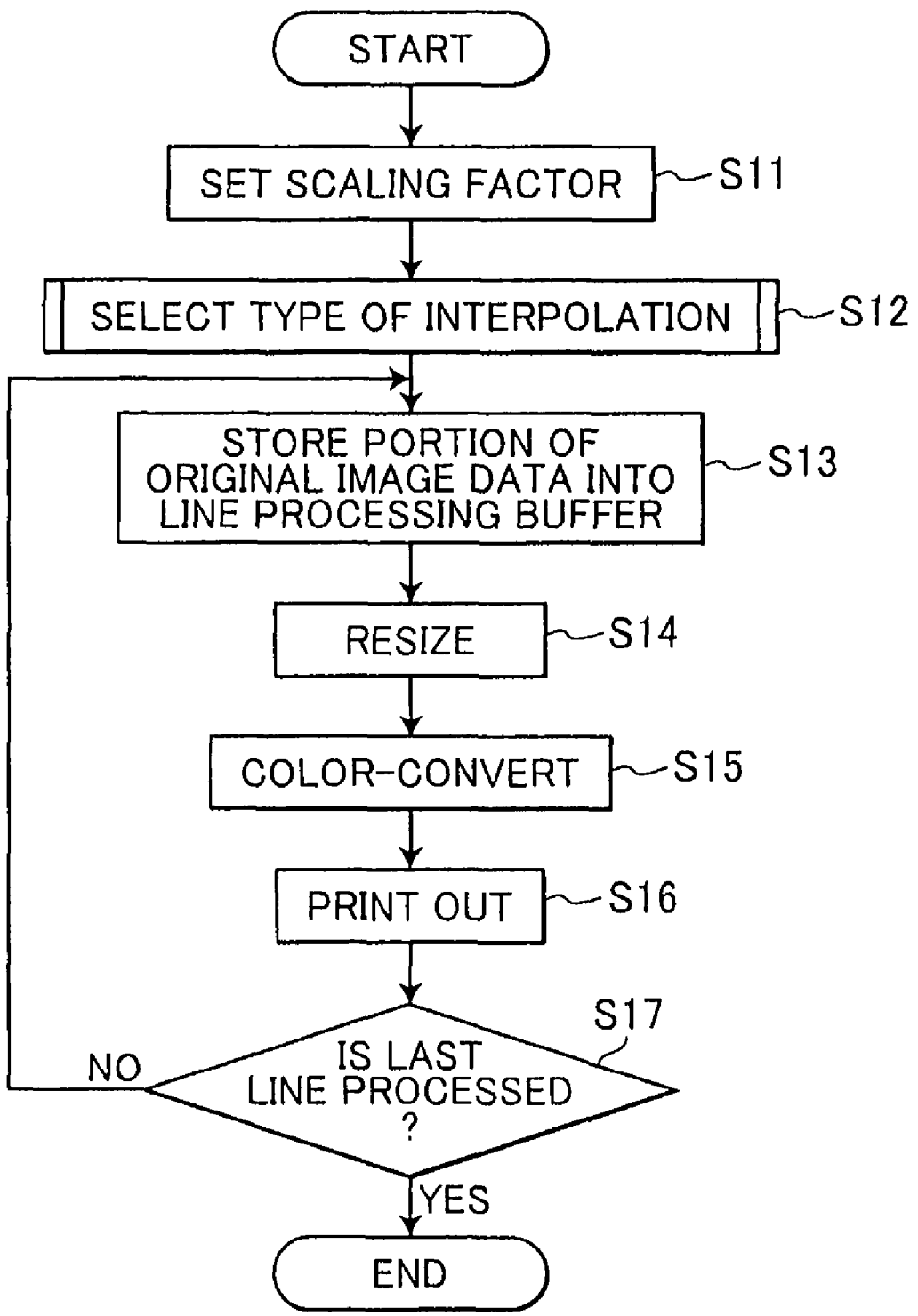

IMAGE PROCESSING DEVICES AND METHODS FOR RESIZING AN ORIGINAL IMAGE THEREFOR

CROSS REFERENCE TO RELATED APPLICATIONS

This application claims priority from Japanese Patent Application No. 2006-020083 filed Jan. 30, 2006. The entire content of the priority application is incorporated herein by reference.

TECHNICAL FIELD

The present invention relates to an image processing device, in particular an image processing device for resizing an original image in a proper manner depending on a storage capacity of a buffer used for storing the original image.

BACKGROUND

Some methods to resize an original image are well-known, such as a nearest neighbor interpolation, a bi-linear interpolation, a bi-cubic convolution, and an average pixel method.

In the nearest neighbor interpolation, a target pixel of the resized image corresponds to the coordinates of the pixel of the original image having real numbers rather than integers. The gray scale of the original image pixel nearest to the target pixel is selected as the gray scale of the target pixel of the resized image. The nearest neighbor interpolation, while the edge of the resized image sometimes becomes jagged, is advantageous in that a higher speed computation is available.

The bi-linear interpolation linearly interpolates a gray scale of a given pixel of the resized image, based on the gray scales of four original pixels surrounding the given pixel. Therefore, the gray scale of the given pixel is calculated.

The bi-cubic convolution, which performs interpolation with a higher precision than the bi-linear interpolation, uses a cubic function based on the gray scales of 16 original pixels surrounding the target pixel (see Japanese Patent Application Publication No. 2004-102904).

The average pixel method is an algorithm dedicated to average the gray scales of the pixels with consideration a ratio of the reduced area to the original image area, and then generate the gray scales of pixels constituting the reduced image data. The image reduced by the average-pixel method has a higher quality than images reduced by other interpolation.

Japanese Patent Application Publication No. 2003-256827 discloses an average-pixel method which first enlarges the size of an original image to the size of the least common multiple with the reduced image size, and then averages the gray scales of the pixels.

The methods described above are properly selected depending on priorities such as a image quality and a processing speed.

When an image processing device processes image information, the information of an original image is required to be stored in the memory prior to the processing. If the all information for one image or all the images for one page is stored simultaneously therein, the memory has to have a large storage capacity, which may result in that the manufacturing cost of the image processing device becomes expensive.

FIG. 1 shows a flowchart for a conventional printing process. First, all image data for one page of an original image to be printed is stored into the buffer (S1). The image data includes three gray scales of red, green, and blue (RGB) for each pixel. For example, the image data captured by the digital camera is compressed into a JPEG format and stored in the memory. The compressed image data is decoded to a bitmap format on a line basis (in a horizontal direction) and then stored in the buffer.

Next, the image processing for resizing the original image is performed according to the image data stored in the buffer (S2). Generally, the average-pixel method is employed for reducing the original image. The bi-cubic convolution is employed for enlarging the original image.

The resizing process further determines the RGB values for each target pixel. The RGB values are then converted into the respective cyan, magenta, yellow, and black (CMYK) values for printing (S3), and sent to the printing section after a halftone process (S4).

The conventional method thus requires a large storage capacity for the buffer. In addition, when an image processing device is a printer to print on a recording medium, the printing is generally performed after all of the image is processed. Such procedure causes the disadvantage that a long time is needed for the printing.

Therefore, an object of the present invention is to provide an image processing device for resizing an original image in a proper manner depending on a storage capacity of a buffer used for storing the original image.

SUMMARY

The present invention provides an image processing device for processing an original image having a first number of horizontal lines parallel to one another. Each of the first number of horizontal lines includes a second number of pixels. The image processing device has a processing unit and a storage unit. The processing unit resizes the original image to an output image with a scaling factor, the output image having a plurality of target pixels. The storage unit stores a gray scale of each pixel in at least one of the first number of horizontal lines. The processing unit has a first calculating unit, a selecting unit, and a second calculating unit. The first calculating unit calculates a maximum number of horizontal lines which the storage unit is able to store at once, based on the second number of pixels, the maximum number being less than the first number. The selecting unit selects a resizing method to resize the original image based on the scaling factor and the maximum number of horizontal lines. The second calculating unit calculates a gray scale of the target pixel in the output image with the selected method.

The present invention provides a computer program recorded on a computer readable recording medium, executable by a computer. The program includes instructions for resizing an original image to an output image with a scaling factor, the original image comprising a first number of horizontal lines, each of the first number of horizontal lines including a second number of pixels, the output image comprising a plurality of target pixels, and instructions for storing a gray scale of each pixel in at least one of the first number of horizontal lines. The instructions for resizing includes instructions for calculating a maximum number of horizontal lines which the storage unit is able to store at once, based on the second number of pixels, the maximum number being less than the first number, instructions for selecting a resizing method to resize the original image based on the scaling factor and the maximum number of horizontal lines, and instructions for calculating a gray scale of the target pixel in the output image with the selected method.

The present invention provides an image processing method for processing an original image comprising a first number of horizontal lines parallel to one another, each of the first number of horizontal lines including a second number of pixels. The method includes resizing the original image to an output image with a scaling factor, the output image comprising a plurality of target pixels, and storing a gray scale of each pixel in at least one of the first number of horizontal lines. The resizing includes calculating a maximum number of horizontal lines which the storage unit is able to store at once, based on the second number of pixels, the maximum number being less than the first number, selecting a resizing method to resize the original image based on the scaling factor and the maximum number of horizontal lines, and calculating a gray scale of the target pixel in the output image with the selected method.

BRIEF DESCRIPTION OF THE DRAWINGS

Illustrative aspects in accordance with the invention will be described in detail with reference to the following figures wherein:

FIG. 1 is a flowchart showing a conventional printing process;

FIG. 2 is a block diagram showing a printer according to an embodiment of the present invention;

FIG. 3 is a flowchart showing a procedure for printing;

DETAILED DESCRIPTION

Figure 4:
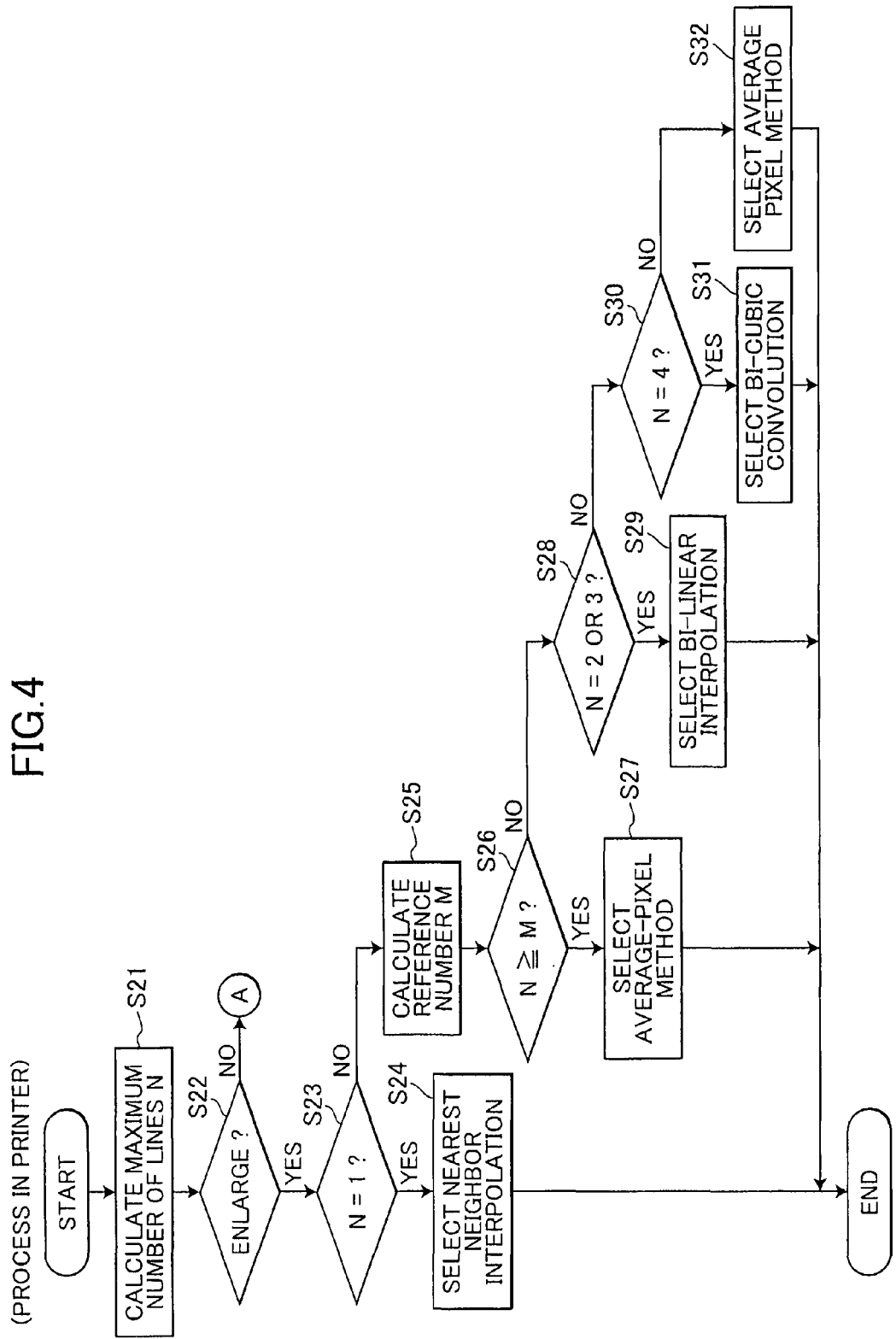
FIG. 4 is a flowchart showing a procedure for selecting a type of interpolation when an original image is reduced.

An image processing device according to some embodiments of the invention will be described while referring to FIGS. 2 to 5, wherein like parts and components are designated by the same reference numerals to avoid duplicating description. In the following description, the expressions "front", "rear", "above", "below", "right", and "left", are used throughout the description to define the various parts when the image processing device is disposed in an orientation in which the image processing device is intended to be used.

FIG. 2 shows a printer 1 to print on a printing medium such as a sheet. The printer 1 further has a function to resize an original image data entered from an external peripheral device at a predetermined ratio. The printer 1 receives an original image data from a personal computer (PC) 2, a digital camera 21, or an external media 20.

The printer 1 includes a controller 10 having a CPU 11, a ROM 12, and a RAM 13. The printer 1 also includes a printing section 15 having a print head (not shown) for printing on the printing medium, and an operating panel 16 having a key board (not shown) through which a user is able to enter an instruction and/or an input value such as an scaling factor for resizing.

The printer 1 further includes an interface (designated as "I/F") 17 to connect the controller 10 to the PC through a cable 5, another I/F 18 to connect the controller 10 to a digital camera 21 through a cable 6, and an external media slot 19 for receiving an external media 20. In this description, the external media 20 may consist of a secure digital (SD) memory card or a flash memory like a memory stick. A USB (Universal Serial Bus) may be employed for the I/F 17 or 18.

The CPU 11 is a processing unit provided in the controller 10 for controlling the printer 1. The ROM 12 stores various control programs to be implemented by the CPU 11, and fixed values to be referred by the programs. Specially, the ROM 12 includes an image processing program area to store an image processing program 12a for image processing.

The RAM 13 is a rewritable memory, which includes a working area having various register groups required for the control programs for the CPU 11, and a temporary area for storing temporary data during processing, allowing the stored data to be accessed at random. The RAM 13 includes a line processing buffer 13a, a scaling memory 13b, and a reference number memory 13c. The line processing buffer 13a stores at least a part of the original image data. The scaling memory 13b stores a resizing ratio. The reference number memory 13c stores a reference number which is number of pixels to be averaged by an average-pixel method.

The line processing buffer 13a stores the image data constituting the original image data on a horizontal line basis thereof. In this embodiment, the original image data includes pixel data fox each pixel, such as a gray scale for each of red, green, and blue (RGB). The original image data is made by using one of a lot of graphic file formats including bmp, jpeg, and gif.

The scaling memory 13b stores a scaling ratio, i.e., an enlargement or reduction ratio and/or a resizing ratio of the original image data.

The image processing program 12a processes the original image data stored in the line processing buffer 13a at the scaling ratio stored in the scaling memory 13b for generating the output image data.

Thus, when the original image data is stored in the PC 2, the original image data is entered into the printer 1 through the cable 5 and the I/F 17. When the original image data is captured by the digital camera 21, the original image data is entered into the printer 1 through the cable 6 and the I/F 18. When the original image data is stored in the external media 20, the original image data is entered into the printer 1 from the external media 20 through the external media slot 19.

Referring to FIG. 3, the process for resizing and printing the original image will be described. First, a user enters a resizing ratio, i.e., a scaling factor to the printer 1 through the operating panel 16 (S11).

Generally, the CPU 11 enlarges or reduces the coordinates of the original image size (ix, iy) to the coordinates of an output image size (ox, oy) according to the resizing ratio. In this embodiment, the original image is resized with maintaining an aspect ratio thereof. In other words, the ratio is set as ox/ix, which is the same value as oy/iy. The resizing ratio is stored in the scaling memory 13b of the RAM 13.

Next, the CPU 11 selects a method for interpolating new pixel data (S12). The CPU 11 selects an optimum interpolation according to the maximum number of horizontal lines of the original image data which the line processing buffer 13a can store. It is noted that the original image data generally consists of a plurality of horizontal lines parallel to one another, each horizontal line consisting a plurality of pixels, each pixel having a gray scale according to the original image. Next, the CPU 11 sends the original image data in the line processing buffer 13a (S13). The original image data sent to the line processing buffer 13a has three gray scales of RGB for each pixel. The image data captured by the digital camera is generally compressed into a JPEG format. Accordingly, the compressed image data is decoded into a bitmap format on a horizontal line basis, and then stored in the line processing buffer 13a.

The only horizontal lines of the image data to be processed by the selected interpolation are sent to the line processing buffer 13a. The horizontal lines not to be processed may be skipped.

Next, the number of pixels in one horizontal line of the image data stored in the line processing buffer 13a is increased or decreased by the selected interpolation (S14). The interpolation generates a set of gray scale for each RGB of each new pixel.

Subsequently, the set of gray scale for each RGB of each new pixel is converted to CMYK values, respectively, for a printing process (S15). After a halftone process is performed for each pixel, new pixel data is sent to the printing section 15 for printing (S16).

After S16, the CPU 11 determines whether or not the last horizontal line of the original image is processed by the above steps S13 through S16 (S17). If an unprocessed horizontal line of the original image data is left (S17: No), the CPU 11 returns to Step S13. If the last horizontal line is processed (S17: Yes), the printing process comes to an end.

Figure 5A:
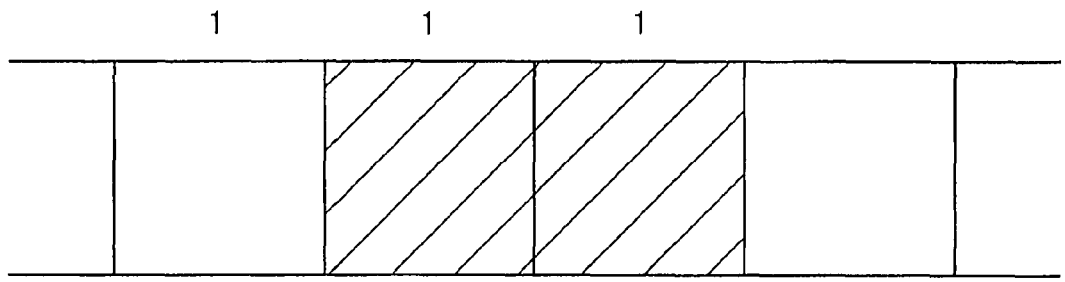
FIGS. 5A and 5B show diagrams showing relationship between a reference number and a scaling factor.

Referring now to FIGS. 3 to 5, a procedure to select the interpolation will be described. First, the CPU 11 determines a maximum number of horizontal lines N of the original image which is stored in the line processing buffer 13a (S21). The maximum number of lines N is obtained by dividing the storage capacity of the line processing buffer 13a by the amount of data for one horizontal line of the original image and then dropping the fractional portion of the quotient.

For example, each pixel of the original image has three gray scales for RGB. If each gray scale consists of 8 bit (1 byte), each pixel requires 3 byte of a storage capacity. If the original image is made by XGA, the original image has 1,024 pixels in a horizontal direction, which means that each line is consisted by 3×1,024=3,072 byte (3 kilobyte) of image data.

If a storage capacity of the line processing buffer 13a is 16 kilobyte, $$16/3=5.33.$$

Therefore, the maximum number of horizontal lines N becomes 5.

The total number of pixels of a recent digital camera is considerably larger than the storage capacity of the line processing buffer 13a, so that the line processing buffer 13a is required to have a larger storage capacity.

Next, the CPU 11 determines whether or not the original image is reduced (S22). Specifically, if the scaling factor stored in the scaling memory 13b is smaller than 1, the image will be reduced. If the scaling factor is larger than 1, the image will be enlarged.

If the image is to be reduced (S22: Yes), the CPU 11 determines whether or not the maximum number of lines N is 1 (S23). If the maximum number of lines N is 1 (S23: Yes), the CPU 11 selects a nearest neighbor interpolation for reducing the number of pixels of the original image (S24) at the scaling factor.

In Step S23, if the maximum number of lines N is not 1 (S23: No), the CPU 11 calculates a reference number M which corresponds to the number of pixels to be averaged together by an average-pixel method (S25). The reference number M is determined by the scaling factor. If the reciprocal of this scaling factor or the enlargement ratio (ix/ox) is an integer, this integral is used as the reference number M. If the enlargement ratio has a fractional portion, the reference number M is obtained by dropping the fractional portion of the enlargement ratio and then adding 2 to the integral portion of the enlargement ratio.

FIG. 5 shows a relationship between the reference number M and a pixel. In FIG. 5, a plurality of pixels, which represent by each square, is arranged in a horizontal direction. If the scaling ratio (ix/ox) is an integer such as 2 and the reference number is then 2, the plurality of pixels adjacent to one another is always grouped every the same number of pixels as the reference number, and boundary portion of the group is always positioned on the boundary line between two adjacent pixels.

Figure 5B:
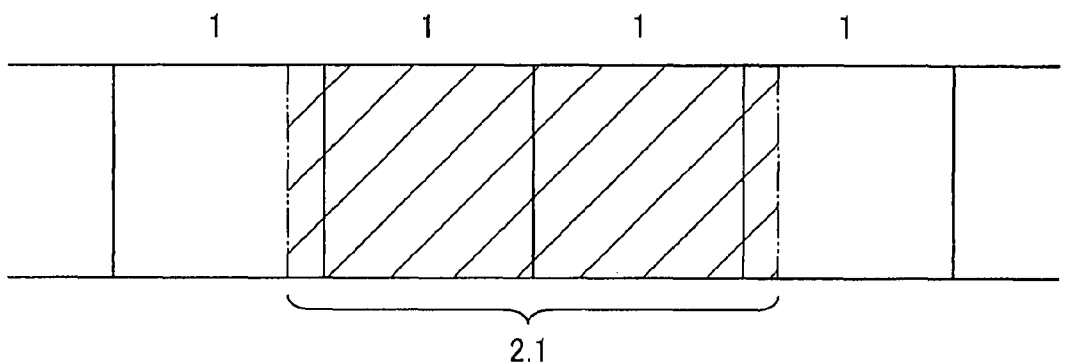

On the other hand, as shown in FIG. 5B, if a scaling factor has a fractional portion like 2.1, it is nearly impossible to group the plurality of pixels on the reference number of pixels basis. In this case, the grouped pixels may include two complete pixels and two incomplete pixels on both sides of the two complete pixels. Accordingly, the reference number M is obtained by dropping the fractional portion of the scaling factor and then adding 2 to the integral portion thereof.

Referring back to FIG. 4, after calculating the reference number M in Step S25, the CPU 11 determines whether or not the maximum number of lines N is equal to or larger than the reference number M (S26). If the maximum number of lines N is equal to or larger than the reference number M (S26: Yes), the CPU 11 selects the average-pixel method for reducing the number of pixels of the original image at the scaling factor (S27).

In Step S26, if the maximum number of lines N is less than the reference number M (S26: No), the CPU 11 determines whether or not the maximum number of lines N is 2 or 3 (S28).

If the maximum number of lines N is 2 or 3 (S28: Yes), the CPU 11 selects a bi-linear interpolation for reducing the number of pixels of the original image (S29). If the maximum number of lines N is not 2 nor 3 (S28: No), the CPU 11 determines whether or not the maximum number of lines N is 4 (S30). If the maximum number of lines N is 4 (S30: Yes), the CPU 11 selects a bi-cubic convolution for reducing the number of pixels of the original image (S31). If the maximum number of lines N is not 4 (S30: No), the CPU 11 selects the average pixel method for reducing the number of pixels of the original image at the scaling factor (S32).

Figure 6:
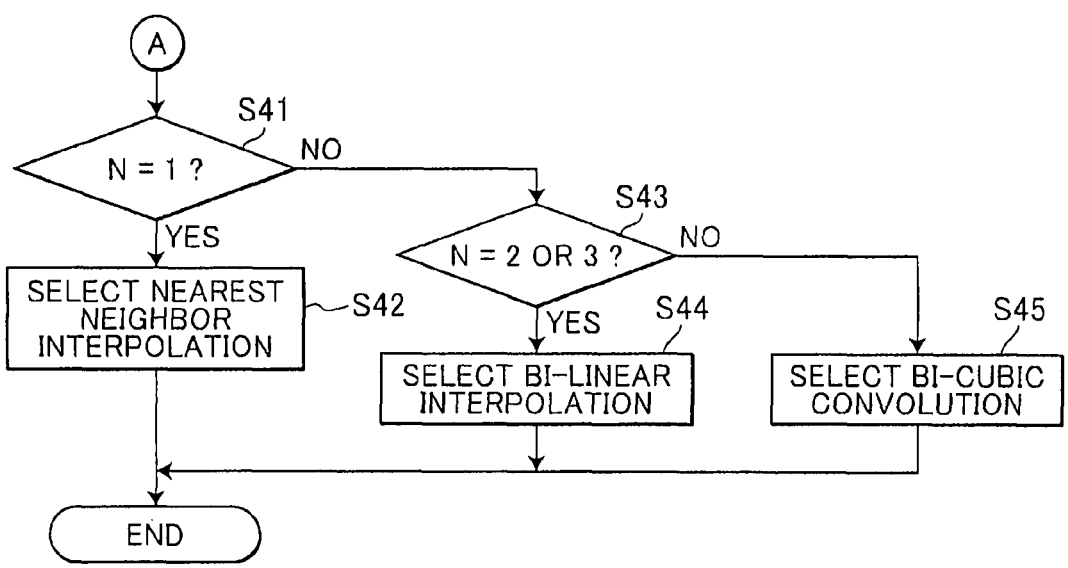
FIG. 6 is a flowchart showing a procedure for selecting a type of interpolation when the original image is enlarged.

On the other hand, in Step S22, if the image is to be enlarged (S12: No), in other words, if the scaling factor stored in the scaling memory 13b is larger than 1, the CPU 11 advances to the steps shown in FIG. 6. The CPU 11 determines whether or not the maximum number of lines N is 1 (S41). If the maximum number of lines N is 1 (S41: Yes), the CPU 11 selects the nearest neighbor interpolation for increasing the number of pixels of the original image (S42). In Step S41, if the maximum number of lines N is not 1 (S41: No), the CPU 11 determines whether or not the maximum number of lines N is 2 or 3 (S43). If the maximum number of lines N is 2 or 3 (S43: Yes), the CPU selects a bi-linear interpolation for increasing the number of pixels of the original image (44). If the maximum number of lines N is not 2 nor 3 (S43: No), the CPU 11 selects the bi-cubic convolution for increasing the number of pixels of the original image at the scaling factor (S45). After the CPU 11 finishes selecting the type of interpolation for resizing the original image, the CPU 11 moves on to step S13 shown in FIG. 2.

In the above embodiments, the original image is resized by using the same scaling factor to the horizontal lines and the longitudinal lines perpendicular to the horizontal lines of the original image. However, the line processing buffer 13a stores enough amount of data for each pixel in the horizontal line. Therefore, if the original image is to be reduced, the gray scale of the target pixel on the horizontal line may be calculated by the average-pixel method, and the gray scale of the target pixel on the longitudinal line may be calculated by the interpolation which is selected according to the maximum number of lines N and the reference number M.

Similarly, if the original image is to be enlarged, the gray scales of the target pixels on the horizontal line may be calculated by the bi-cubic convolution, and the gray scales of the target pixel on the longitudinal line may be calculated by the method determined by the maximum number of lines N.

As described above, in the printer 1, the CPU 11 determines the maximum number of horizontal lines of the original image to be stored in the line processing buffer 13a, considering the storage capacity of the line processing buffer 13a, and then selects a type of interpolation depending on the scaling factor and the maximum number of horizontal lines M. Therefore, the line processing buffer 13a is not required to have a capacity sufficient to store all data related to all horizontal lines of the original image. In other words, all data of the original image is divided into some potions, and each portion has an appropriate amount of data to be processed only once by the line processing buffer 13a. Even if the line processing buffer 13a does not have sufficient storage capacity to store all data of the original image, the printer 1 is able to resize the original image by a desired scaling factor and provide the output image.

If the printer 1 is a line printer to print on a line basis, the CPU 11 reads the original image on a line basis, resizes the line, and then prints on the printing medium. Accordingly, the total time required for resizing and printing can be shortened.

It is understood that the foregoing description and accompanying drawings set forth the embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

In another embodiment, the image processing device may be a copier having a scanner so that the image data scanned on a line basis by the scanner can be processed sequentially in the same manner as the above.

In further embodiment, if the scaling factor has a fractional portion, the reference number M may be rounded off the scaling factor and then added 1 to the rounded-off value. Specifically, if a part of pixel used to be averaged with other pixels is not so large as the one complete pixel, the gray scales of that part may be omitted.

Furthermore, the present invention is applicable to a monochrome image having only a gray scale for each pixel.

What is claimed is:

1. An image processing device for processing an original image, comprising:
   a processing unit that resizes the original image to an output image with a scaling factor, the output image comprising a plurality of target pixels, the original image comprising a plurality of horizontal lines, each of the plurality of horizontal lines comprising a plurality of pixels; and
   a storage unit having a predetermined storage capacity, the storage unit sequentially storing portions of the original image, wherein the processing unit comprises:
   a determining unit that determines how many horizontal lines are to be stored in the storage unit at once as the portion of the original image, based on a number of pixels each horizontal line has;
   a selecting unit that selects a first resizing method to resize the original image when the determining unit determines that a first number of horizontal lines are to be stored in the storage unit at once as the portion of the original image, the selecting unit selecting a second resizing method to resize the original image when the determining unit determines that a second number of horizontal lines are to be stored in the storage unit at once as the portion of the original image;
   a calculating unit that, each time one of the portions of the original image is stored in the storage unit, calculates a gray scale of the target pixels of the portion of the original image stored in the storage unit with the first resizing method on the first number of horizontal lines basis when the first resizing method is selected by the selecting unit, and with the second resizing method on the second number of horizontal lines basis when the second resizing method is selected by the selecting unit, thereby obtaining a resized image corresponding to the whole original image; and
   a printing unit that prints the output image on a recording medium on a horizontal line basis.

2. The image processing device according to claim 1, wherein the original image is compressed in a JPEG format.

3. The image processing device according to claim 1, wherein the selecting unit selects a nearest neighbor interpolation as the resizing method, if the determined first number is 1.

4. The image processing device according to claim 1, wherein the processing unit further comprises a second calculating unit that calculates a number of pixels to be averaged by an average pixel method as a reference number, wherein if the scaling factor is less than 1, the selecting unit selects the resizing method, based on the determined first number and a reference number.

5. The image processing device according to claim 4, wherein if the scaling factor is less than 1, the selecting unit selects the average pixel method as the resizing method if the determined first number is more than or equal to the reference number.

6. The image processing device according to claim 4, wherein if the scaling factor is less than 1, the selecting unit selects the average pixel method for resizing each of the first number of horizontal lines, and determines the resizing method for longitudinal pixels perpendicular to the first number of horizontal lines, based on the determined first number and the reference number if the determined first number is more than the reference number.

7. The image processing device according to claim 1, wherein if the scaling factor is more than 1, the selecting unit selects a bi-cubic interpolation for resizing each of the determined first number of horizontal lines, and determines the resizing method for longitudinal pixels perpendicular to the determined first number of horizontal lines, based on the determined first number.

8. A computer program recorded on a non-transitory computer readable recording medium, executable by a computer, comprising:
   instructions for resizing an original image to an output image with a scaling factor, the original image comprising a plurality of horizontal lines, each of the plurality of horizontal lines comprising a plurality of pixels, the output image comprising a plurality of target pixels; and
   instructions for storing a gray scale of each pixel of a portion of the original image sequentially, wherein the instructions for resizing comprises:

instructions for determining how many horizontal lines are to be stored in a storage unit at once as the portion of the original image, based on a number of pixels each horizontal line has;

instructions for selecting a first resizing method to resize the original image when a first number of horizontal lines are determined to be stored in the storage unit at once as the portion of the original image, and selecting a second resizing method to resize the original image when a second number of horizontal lines are determined to be stored in the storage unit at once as the portion of the original image;

instructions for, each time the portion of the original image is stored in the storage unit, calculating a gray scale of the target pixel of the portion of the original image stored in the storage unit with the first resizing method on the first number of horizontal lines basis when the first resizing method is selected, and with the second resizing method on the second number of horizontal lines basis when the second resizing method is selected, thereby obtaining a resized image corresponding to the whole original image; and instructions for printing the output image on a recording medium on a horizontal line basis.

9. The computer program according to claim 8, wherein the original image is compressed in a JPEG format.

10. The computer program according to claim 8, wherein the instructions for selecting selects a nearest neighbor interpolation as the resizing method, if the determined first number is 1.

11. The computer program according to claim 8, further comprising instructions for calculating a number of pixels to be averaged by an average pixel method as a reference number, wherein if the scaling factor is less than 1, the instructions for selecting selects the resizing method, based on the determined first number and a reference number.

12. The computer program according to claim 11, wherein if the scaling factor is less than 1, the instructions for selecting selects the average pixel method as the resizing method if the determined first number is more than or equal to the reference number.

13. The computer program according to claim 11, wherein if the scaling factor is less than 1, the instructions for selecting selects the average pixel method for resizing each of the first number of horizontal lines, and determines the resizing method for longitudinal pixels perpendicular to the first number of horizontal lines, based on the determined first number and the reference number if the determined first number is more than the reference number.

14. The computer program according to claim 8, wherein if the scaling factor is more than 1, the instructions for selecting selects a bi-cubic interpolation for resizing each of the determined first number of horizontal lines, and determines the resizing method for longitudinal pixels perpendicular to the first number of horizontal lines, based on the determined first number.

15. An image processing method for processing an original image, comprising:

resizing the original image to an output image with a scaling factor, the output image comprising a plurality of target pixels, the original image comprising a plurality of horizontal lines, each of the plurality of horizontal lines comprising a plurality of pixels; and storing a gray scale of a portion of the original image sequentially, wherein the resizing comprises:

determining how many horizontal lines are to be stored in a storage unit as the portion of the original image, based on a number of pixels each horizontal line has;

selecting a first resizing method to resize the original image when a first number of horizontal lines are determined to be stored in the storage unit at once as the portion of the original image, and selecting a second resizing method to resize the original image when a second number of horizontal lines are determined to be stored in the storage unit at once as the portion of the original image;

calculating, each time one of the portions of the original image is stored in the storage unit, a gray scale of the target pixels of the portion of the original image stored in the storage unit with the first resizing method on the first number of horizontal lines basis when the first resizing method is selected, and with the second resizing method on the second number of horizontal lines basis when the second resizing method is selected, thereby obtaining a resized image corresponding to the whole original image; and printing the output image on a recording medium on a horizontal line basis.

* * * * *